United States Patent
Katsumata (10) Patent No.: US 9,109,958 B2
(45) Date of Patent: Aug. 18, 2015

(54) MULTI-CHAMBER HEAT TREATMENT DEVICE AND TEMPERATURE CONTROL METHOD

(75) Inventor: Kazuhiko Katsumata, Tokyo (JP)

(73) Assignee: IHI Corporation, Tokyo (JP)

( * ) Notice: Subject to any disclaimer, the term of this patent is extended or adjusted under 35 U.S.C. 154(b) by 1123 days.

(21) Appl. No.: 12/810,823

(22) PCT Filed: Nov. 14, 2008

(86) PCT No.: PCT/JP2008/070762
§ 371 (c)(1),
(2), (4) Date: Sep. 27, 2010

(87) PCT Pub. No.: WO2009/084335
PCT Pub. Date: Jul. 9, 2009

(65) Prior Publication Data
US 2011/0008742 A1      Jan. 13, 2011

(30) Foreign Application Priority Data

Dec. 27, 2007   (JP) ................. 2007-337931

(51) Int. Cl.
| | |
|---|---|
| *G01K 1/14* | (2006.01) |
| *F27B 5/18* | (2006.01) |
| *F27D 7/06* | (2006.01) |
| *F27D 15/02* | (2006.01) |

(Continued)

(52) U.S. Cl.
CPC ... *G01K 1/14* (2013.01); *F27B 5/18* (2013.01); *F27D 7/06* (2013.01); *F27D 15/02* (2013.01); *F27D 19/00* (2013.01); *F27D 21/0014* (2013.01)

(58) Field of Classification Search
CPC ..... B60R 16/0215; H01R 4/22; H02G 3/0487
USPC .................. 432/36, 77; 174/84 S, 84 R, 88 R
See application file for complete search history.

(56) References Cited

U.S. PATENT DOCUMENTS

| | | | | |
|---|---|---|---|---|
| 2,129,540 A | * | 9/1938 | Van Billiard | 174/88 R |
| 3,973,656 A | * | 8/1976 | Zumbro | 191/12 R |

(Continued)

FOREIGN PATENT DOCUMENTS

| | | |
|---|---|---|
| JP | 7-18249 | 3/1995 |
| JP | 9-280968 | 10/1997 |

(Continued)

OTHER PUBLICATIONS

International Search Report, issued in corresponding application PCT/JP2008/070762, completed Jan. 29, 2009, mailed Feb. 10, 2009.

(Continued)

*Primary Examiner* — Alissa Tompkins
*Assistant Examiner* — John Bargero
(74) *Attorney, Agent, or Firm* — Griffin & Szipl, P.C.

(57) ABSTRACT

The multi-chamber heat treatment device includes a temperature sensor (31) attached to an object to be treated (X), a signal transmission unit (30) which transmits a detected signal from the temperature sensor to the outside of a heating chamber and a cooling chamber, and a temperature measuring unit (40) which is arranged outside the heating chamber and the cooling chamber to measure the temperature of the object from the detected signal of the temperature sensor transmitted from the signal transmission unit (30).

6 Claims, 7 Drawing Sheets

(51) Int. Cl.
*F27D 19/00* (2006.01)
*F27D 21/00* (2006.01)

(56) References Cited

U.S. PATENT DOCUMENTS

| | | | | |
|---|---|---|---|---|
| 4,404,425 | A * | 9/1983 | Rich | 174/107 |
| 6,392,147 | B1 * | 5/2002 | Hier et al. | 174/70 C |
| 6,497,502 | B1 * | 12/2002 | Clift et al. | 362/392 |
| 6,770,821 | B2 * | 8/2004 | Higgs | 174/135 |
| 7,271,346 | B1 * | 9/2007 | Ettinger et al. | 174/135 |
| 2008/0217487 | A1 * | 9/2008 | O'Rourke et al. | 248/65 |

FOREIGN PATENT DOCUMENTS

| | | |
|---|---|---|
| JP | 2004-45283 | 2/2004 |
| JP | 2004-263277 | 9/2004 |
| JP | 2005-241132 | 9/2005 |
| JP | 2007-46123 | 2/2007 |

OTHER PUBLICATIONS

Machine English translation of JP 2005-241132 cited in an IDS filed Jun. 25, 2010 and considered Apr. 3, 2013.

* cited by examiner

MULTI-CHAMBER HEAT TREATMENT DEVICE AND TEMPERATURE CONTROL METHOD

This is a National Phase Application in the United States of International Patent Application No. PCT/JP2008/070762, filed Nov. 14, 2008, which claims priority on Japanese Patent Application No. 337931/2007, filed Dec. 27, 2007. The entire disclosures of the above patent applications are hereby incorporated by reference.

BACKGROUND OF THE INVENTION

1. Technical Field of the Invention

The present invention relates to a multi-chamber heat treatment device and its temperature control method which heat-treats an object to be treated in a heating chamber, and then moves the object into a cooling chamber to perform cooling treatment in the cooling chamber.

2. Description of the Related Art

A multi-chamber heat treatment device is a heat treatment device which includes a heating chamber which heat-treats an object to be treated, and a cooling chamber which performs cooling treatment on the object heat-treated in the heating chamber, and conveys and performs heat treatment of the object between the heating chamber and the cooling chamber.

In this multi-chamber heat treatment device, when the temperature of the object during heat treatment needs to be measured, conventionally, as disclosed in Patent Document 1, a temperature sensor is attached to the object, and the object is conveyed along with a data recorder which stores the temperature detection result from the temperature sensor.

That is, in this case, the data recorder exists along with the object in the heating chamber and the cooling chamber. Since this data recorder is heat-treated together with the object, the data recorder is housed in a case which has excellent heat resistance and heat insulation performance. Also, the data recorder is taken out from the inside of the cooling chamber after the completion of the cooling treatment on the object, and the temperature of the object during heat treatment is taken from the temperature detection result stored in the data recorder.

However, the means of Patent Document 1 had a problem in that the arrangement space for the object in the heating chamber and the cooling chamber becomes narrow, and the temperature of the object cannot be measured in real time.

Thus, in order to solve this problem, the inventor of the invention has invented and already filed the inventions of Patent Documents 2 and 3.

Patent Document 2 aims at reducing the space exclusively possessed by the temperature measuring unit arranged in a heat treatment furnace, securing the wide arrangement space for the object in the heat treatment furnace, and measuring the temperature of the object arranged in the heat treatment furnace in real time.

Figure 1:
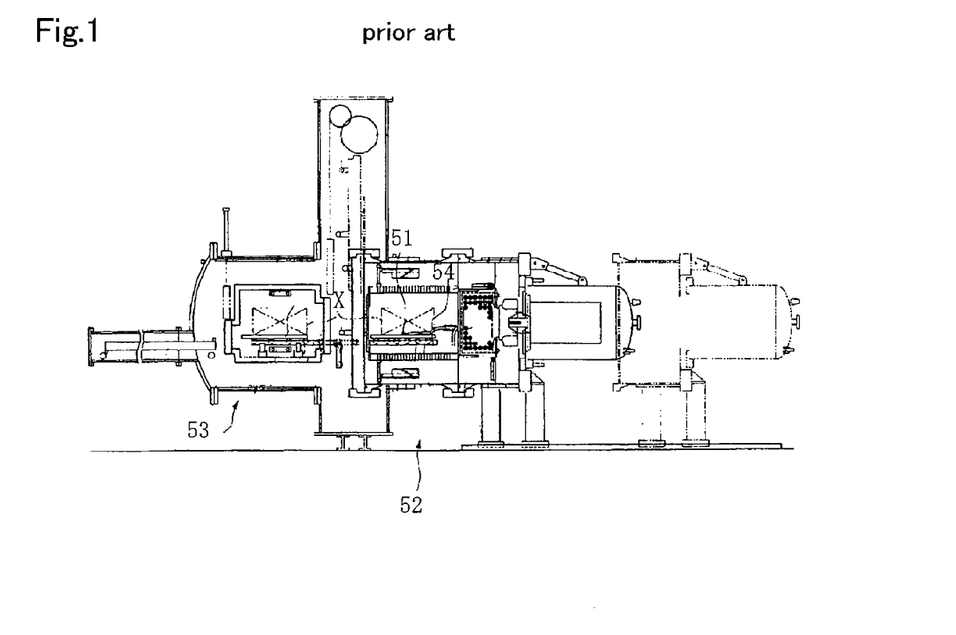
FIG. 1 is a schematic view of a multi-chamber heat treatment device of Patent Document 2.

Therefore, as shown in FIG. 1, this invention is a multi-chamber heat treatment device including at least a heating chamber 53 which heat-treats an object to be treated X, and a cooling chamber 52 which performs cooling treatment on the object X which is heat-treated in the heating chamber 53. The device includes a sensor part 51 which is fixed to a predetermined spot of a tray for conveying the object X, a measuring part (not shown) which is electrically connected to the sensor part 51 and is arranged outside, a connection line 54 which has the sensor part 51 connected to one end thereof and has the measuring part connected to the other end thereof and thereby eclectically connecting the sensor part 51 and the measuring part, and a reel part (not shown) which is arranged in the cooling chamber 52 and is capable of winding the above connection line 54.

Patent Document 3 aims at securing the wide arrangement space for the object in the heating chamber and the cooling chamber, and measuring the temperature of the object in real time to perform cooling control accurately.

Figure 2:
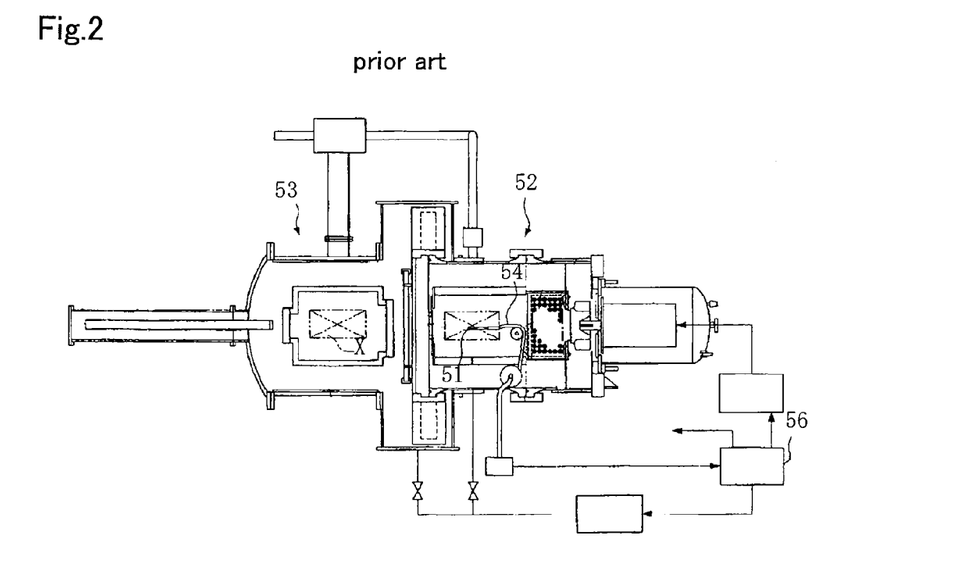
FIG. 2 is a schematic view of a multi-chamber heat treatment device of Patent Document 3.

Therefore, as shown in FIG. 2, this invention is a multi-chamber heat treatment device including at least a heating chamber 53 which heat-treats an object to be treated X, and a cooling chamber 52 which performs cooling treatment on the object X which is heat-treated in the heating chamber. The device includes a temperature sensor 51 which detects the temperature of the object in the cooling chamber 52 and outputs a temperature detection signal indicating the temperature, a cooling control part 56 which is arranged outside the heating chamber and the cooling chamber and controls cooling treatment on the basis of the temperature of the object in the cooling chamber which is indicated by the temperature detection signal input from the temperature sensor 51, and a connection line 54 which connects the temperature sensor and the cooling control part.

Patent Document 1: Japanese Patent Application Laid-Open No. 9-280968

Patent Document 2: Japanese Patent Application Laid-Open No. 2005-241132

Patent Document 3: Japanese Patent Application Laid-Open No. 2007-46123

However, in the above-described Patent Documents 2 and 3, since there is no fixing means for receiving the tension which acts on the connection line 54, there is a possibility that the object loaded into the heating chamber is likely to move when winding tension is high. Therefore, the inventions cannot be applied to a large-sized furnace through which the reel part needs to be wound for a long distance.

Additionally, in the case of the multi-chamber heat treatment device of Patent Documents 2 and 3 described above, there is a problem in that the vacuum shielding door of the cooling chamber cannot be sealed while the object is heat-treated in the heating chamber.

Therefore, the gas atmosphere in the cooling chamber may become the same as that of the heating chamber during heating treatment of the object. As a result, there is a problem in that, after the object is housed in the cooling chamber after heating treatment, the cooling chamber needs to be decompressed again, and the gas atmosphere needs to be readjusted.

Additionally, since the heat insulation door is closed in a state where the signal line is bitten by the heat insulation door of the heating chamber while the object is heat-treated in the heating chamber, there is a problem that the gap between the heat insulation door and the signal line is large, and the heat leaks to the outside during heating.

SUMMARY OF THE INVENTION

The invention has been invented in order to solve the aforementioned problems. That is, the object of the invention is to provide a multi-chamber heat treatment device and its temperature control method capable of heat-treating an object to be treated in a heating chamber, and then moving the object into a cooling chamber to perform cooling treatment in the cooling chamber, and capable of measuring in real time the temperature of the object during heating treatment and cooling treatment, with no possibility of the object loaded into the heating chamber moving even when winding tension is high.

Additionally, another object of the invention is to provide a multi-chamber heat treatment device and its temperature control method capable of suppressing heat dissipation of the heat insulation door of the heating chamber during the heating treatment, and sealing the vacuum shielding door of the cooling chamber, thereby controlling the gas atmosphere of the heating chamber and the cooling chamber independently.

According to the invention, there is provided a multi-chamber heat treatment device including: a heating chamber which incorporates a heating container having a first opening capable of passing horizontally therethrough a transfer base on which an object to be treated is placed, and heat-treating the object therein; a heat insulation door which closes the first opening in an openable/closable manner; a cooling chamber which is adjacent to the heating chamber and having a second opening capable of passing horizontally therethrough the transfer base on which the object is placed from the heating chamber, and cools the object therein; a vacuum shielding door which seals the second opening in an openable/closable manner; and a transfer unit which horizontally transfers the transfer base on which the object is placed between the heating chamber and the cooling chamber.

The multi-chamber heat treatment device includes: a temperature sensor attached to the object; and a signal transmission unit which transmits a detected signal from the temperature sensor to the outside of the heating chamber and the cooling chamber.

According to a preferred embodiment of the invention, the multi-chamber heat treatment device further includes a temperature measuring unit which is arranged outside the heating chamber and the cooling chamber to measure the temperature of the object from the detected signal of the temperature sensor transmitted from the signal transmission unit.

Additionally, the signal transmission unit has a flexible tension member which has one end fixed to the transfer base, extends through the first opening and the second opening, and has the other end horizontally wound in the cooling chamber;

a signal line which has a connector connected to the output line of the temperature sensor at one end, and extends along the tension member to the other end;

a reel unit which winds the tension member along with the signal line while applying tension in a winding direction to the tension member; and an external output line which is connected to the other end of the signal line via the reel unit, and transmits the detected signal to the outside of the cooling chamber.

The tension member has a first pinching portion which is pinched between the heat insulation door and the heating container to seal the pinched portion, when the first opening is closed by the heat insulation door.

The first pinching portion is made of a first heat-resistant seal material having heat resistance which bundles a heat-resistant string member and the output line of the temperature sensor in the shape of a thin plate equivalent to a gap between the heat insulation door and the heating chamber, and which withstands the temperature in the heating chamber.

Additionally, the tension member has a second pinching portion which is pinched between the vacuum shielding door and the cooling chamber to seal the pinched portion, when the second opening is closed by the vacuum shielding door.

The tension member includes a heat-resistant string member having heat resistance which has one end fixed to the transfer base and the other end extending to the inside of the cooling chamber when the transfer base is located in the heating chamber, and withstands the temperature in the heating chamber and the cooling chamber, and a flexible hose having heat resistance which has a tip fixed to a terminal of the heat-resistant string member and a terminal wound around the reel unit, and withstands at least the temperature in the cooling chamber.

The second pinching portion is provided at an intermediate position of the heat-resistant string, is made of a second heat-resistant seal material having heat resistance which bundles and integrally molds a guide strip which connects a heat-resistant string member and the signal line and which withstands the temperature in the cooling chamber, and has a cross-sectional shape which the seal material of the vacuum shielding door can deform to follow the cross-sectional shape.

Additionally, according to another preferred embodiment of the invention, the tension member includes a heat-resistant string member having heat resistance which has one end fixed to the transfer base and the other end extending to an intermediate position between the first opening and the second opening when the transfer base is located in the heating chamber, and withstands the temperature in the heating chamber, and a guide strip having heat resistance which has a tip fixed to a terminal of the heat-resistant string member and a terminal wound around the reel unit, and withstands at least the temperature in the cooling chamber.

The second pinching portion is provided at an intermediate position of the guide strip, is made of a second heat-resistant seal material having heat resistance which bundles and integrally molds the guide strip and the signal line and which withstands the temperature in the cooling chamber, and has a cross-sectional shape which the seal material of the vacuum shielding door can deform to follow the cross-sectional shape.

Additionally, according to the invention, there is provided a temperature control method of a multi-chamber heat treatment device including: a heating chamber which incorporates a heating container having a first opening capable of passing horizontally therethrough a transfer base on which an object to be treated is placed, and heat-treating the object therein; a heat insulation door which closes the first opening in an openable/closable manner; a cooling chamber which is adjacent to the heating chamber and having a second opening capable of passing horizontally therethrough the transfer base on which the object is placed from the heating chamber, and cools the object therein; a vacuum shielding door which seals the second opening in an openable/closable manner; and a transfer unit which horizontally transfers the transfer base on which the object is placed between the heating chamber and the cooling chamber.

The temperature control method includes:

transmitting a detected signal from a temperature sensor attached to the object to the outside of the heating chamber and the cooling chamber;

measuring the temperature of the object from the detected signal of the temperature sensor transmitted from the signal transmission unit, outside the heating chamber and the cooling chamber; and controlling the multi-chamber heat treatment device on the basis of the measured temperature of the object.

According to the apparatus and method of the above invention, the heating chamber which heat-treats the object, the heat insulation door, the cooling chamber which cools the object, the vacuum shielding door, and the transfer unit which horizontally transfers the transfer base on which the object is placed between the heating chamber and the cooling chamber are provided. Thus, the object can be heat-treated in the heating chamber, and can then be moved into the cooling chamber and be subjected to cooling treatment in the cooling chamber.

Additionally, the temperature sensor attached to the object, and the signal transmission unit which transmits the detected signal from the temperature sensor to the outside of the heating chamber and the cooling chamber are provided. Thus, the detected signal of the temperature sensor attached to the object can be transmitted to the outside of the heating chamber and the cooling chamber, the temperature of the object can be measured from the detected signal of the temperature sensor transmitted from the signal transmission unit outside the heating chamber and the cooling chamber, and the temperature of the object during heating treatment and cooling treatment can be measured in real time.

Additionally, the tension member includes the heat-resistant string member which has one end fixed to the transfer base, and the flexible hose or guide strip which has a tip fixed to the terminal of the heat-resistant string member and has a terminal wound around the reel unit, and further has the first pinching portion provided at an intermediate position of the heat-resistant string member.

Thus, when the first opening is closed by the heat insulation door, the first pinching portion is pinched between the heat insulation door and the heating container. Thus, the pinched portion is insulated and sealed, and tension does not act on the object. Thus, even when winding tension is high, there is no possibility of the object loaded into the heating chamber moving.

Additionally, the tension member has a second pinching portion provided at the intermediate position of the heat-resistant string member or guide strip. Thus, when the second opening is closed by the vacuum shielding door, the second pinching portion is pinched between the vacuum shielding door and the cooling chamber, and thus the pinched portion is sealed.

Therefore the heat dissipation of the heat insulation door of the heating chamber can be suppressed during the treatment in the heating chamber, the vacuum shielding door of the cooling chamber can be sealed, and thereby the gas atmosphere of the heating chamber and the cooling chamber can be independently controlled.

Accordingly, from outside the heating chamber and the cooling chamber, the temperature of the object can be measured from the detected signal of the temperature sensor transmitted from the signal transmission unit, and the multi-chamber heat treatment device can be controlled on the basis of the measured temperature of the object.

DESCRIPTION OF THE PREFERRED EMBODIMENT

Hereinafter, preferable embodiments of the invention will be described with reference to the drawings. In addition, in the respective drawings, the same reference numerals will be given to common portions, and duplicate description thereof will be omitted.

Figure 3:
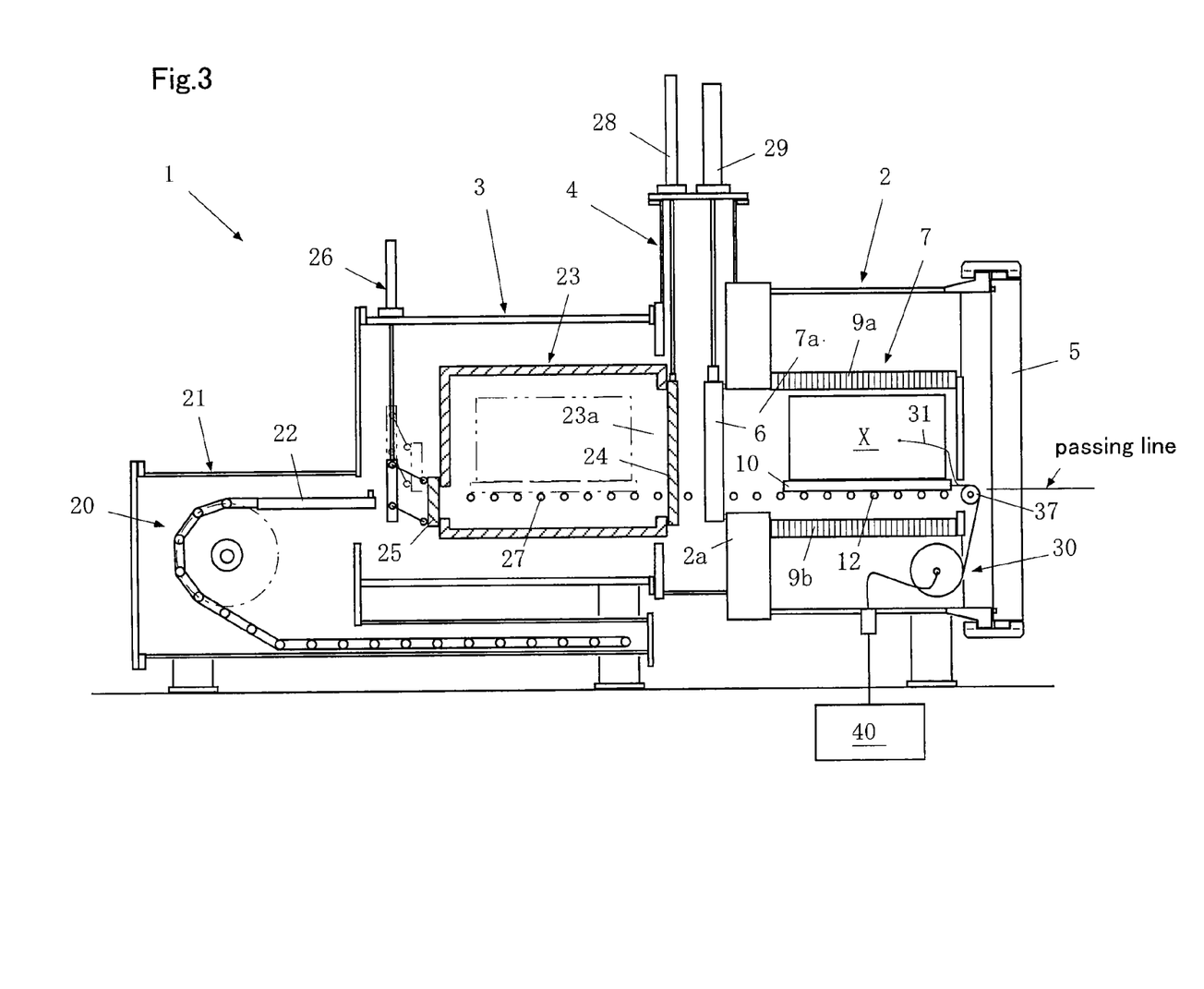
FIG. 3 is a cross-sectional view illustrating one embodiment of a multi-chamber heat treatment device according to the invention.

FIG. 3 is a cross-sectional view illustrating one embodiment of a multi-chamber heat treatment device according to the invention.

As shown in this drawing, the multi-chamber heat treatment device 1 of the invention is a multi-chamber heat treatment device including a cooling chamber 2 which cools an object X to be treated, and a heating chamber 3 which heats the object X, and in addition to these, has an intermediate chamber 4 between the cooling chamber 2 and the heating chamber 3.

The cooling chamber 2 is a substantially hollow cylindrical airtight vessel, and the posture of the cooling chamber is set so that the central axis of the cylindrical shape becomes horizontal. A clutch-type door 5 which moves horizontally in the axial direction of the cooling chamber 2 is provided on one side (right side of the drawing) of the cooling chamber 2. The door 5 is used to house the object X in the cooling chamber 2.

Additionally, a clamp-type vacuum shielding door 6 which is vertically opened and closed is provided at an opening 7a (a second opening) of a partition wall 2a on the other side (left side of the drawing) of the cooling container. The inner space of the multi-chamber heat treatment device 1 is brought into a sealed state where the space is isolated from the outside, with the door 5 closed.

Inside the cooling chamber 2, a substantially rectangular parallelepiped-shaped air passage chamber 7 which is long in the direction of the central axis of the cooling chamber 2 is provided, and gas flow guide plates (not shown) which adjust the flow passage direction of the coolant gas in the cooling chamber 2 are respectively provided above and below the air passage chamber 7. Additionally, the inside of the cooling chamber 2 except the air passage chamber 7 is vertically partitioned by a partition plates which are not shown.

Lattice-like current plates 9a and 9b which rectify the coolant gas to pass the coolant gas therethrough are respectively formed at upper and lower wall portions of the air passage chamber 7. Additionally, a plurality of free rollers 12 for transferring a tray 10 on which the object X is placed in the axial direction of the cooling chamber 2 is rotationally provided inside the air passage chamber 7 in the movement direction of the tray 10. Additionally, the tray 10 is formed in the shape of a lattice so that the coolant gas can pass therethrough.

In this example, the side surface (back surface of the air passage chamber 7 in the drawing) of the cooling chamber 2 includes a heat exchanger, a cooling fan, and a damper which are not shown.

The heat exchanger carries out heat exchange between water and coolant gas, thereby cooling the coolant gas. The cooling fan is driven by a cooling fan motor which is not shown, and adjusts the air volume of the coolant gas which passes through the heat exchanger. The damper adjusts the blowing direction (cooling air direction) of the coolant gas to the object X.

The temperature and flow velocity of the coolant gas which flows in the vertical direction through the current plates $9a$ and $9b$ of the cooling chamber 2 are controlled by the above-described heat exchanger, cooling fan, and damper, so that the cooling rate of the object X can be adjusted.

Meanwhile, the shape of the heating chamber 3 is set to a substantially cylindrical shape with a water-cooled double wall, and water is interposed between an inner wall and an outer wall. The heating chamber is arranged so as to face the cooling chamber 2. Additionally, a conveyance rod 22 for horizontally conveying the tray 10 on which the object X is placed, inside the multi-chamber heat treatment device 1, thereby conveying the object X, is provided inside a conveyance rod housing chamber 21 connected to the heating chamber 3.

In this example, a terminal (the left end in the drawing) of the conveyance rod 22 is connected to a chain, the chain is moved by the rotation of a chain wheel, the conveyance rod 22 is horizontally moved, and the tray 10 which engages with the conveyance rod is horizontally conveyed.

The heating container 23 the shape of which is set to a substantially rectangular parallelepiped shape is provided inside the heating chamber 3. A heat insulation door 24 (heating chamber door) which is vertically opened and closed is provided in an opening $23a$ (a first opening) on one side (the side which faces the cooling chamber 2) of the heating container 23, and a door 25 for a conveyance rod which becomes a doorway of the conveyance rod 22 is provided on the other side of the heating chamber. The door 25 for the conveyance rod is vertically opened and closed by a lifting mechanism 26 which is provided so as to protrude from the outer wall of the heating chamber 3.

Inside the heating container 23, a plurality of free rollers 27 for transferring the tray 10 on the object X to in the axial direction of the heating chamber 3 is provided, and the free rollers 27 are arranged on an extension line (path line) of the free rollers 12 provided inside the air passage chamber 7.

In addition, the heat insulation design of the door 25 for the conveyance rod, a transfer base 28, and the tray 10 are made similarly to a heat insulation door 24. Additionally, a plurality of heaters (not shown) for heating the object X is set above and below the object X inside the heating container 23 so as to uniformly heat the whole object X.

Meanwhile, the shape of the intermediate chamber 4 is set to a substantially hollow rectangular shape, and the intermediate chamber is arranged between the cooling chamber 2 and the heating chamber 3. A lifter 28 for moving the vacuum shielding door 6 up and down, and a lifter 29 for moving the heat insulation door 24 up and down is set above the intermediate chamber.

Additionally, a vacuuming unit (not shown) is provided outside the cooling chamber 2, the heating chamber 3, and the intermediate chamber 4. This vacuuming unit is provided for vacuuming the inside of the cooling chamber 2 and the heating chamber 3, and is connected to the cooling chamber 2 and the heating chamber 3, respectively.

Additionally, a coolant gas supply unit (not shown) is also provided outside the cooling chamber 2, the heating chamber 3, and the intermediate chamber 4. This coolant gas supply unit supplies coolant gas into the cooling chamber 2 under a predetermined pressure on the basis of a coolant gas control signal input from a cooling control unit.

In addition, during maintenance of the multi-chamber heat treatment device 1, since coolant gas may be supplied to the heating chamber 3 and the intermediate chamber 4 which are the outside of the cooling chamber 2, the coolant gas supply unit is also connected to the intermediate chamber.

As described above, the heating chamber 3 has the function of heat-treating the object X therein, and has a first opening $23a$ through which the transfer base 10 on which the object X is placed can pass horizontally, at the heating container 23 on the side of the cooling chamber 2. The first opening $23a$ is adapted to be openable and closable by the lifting of the heat insulation door 24.

Additionally, the cooling chamber 2 has the function of cooling the object X therein, and has a second opening $7a$ which is adjacent to the heating chamber 3, and through which the transfer base 10 on which the object X is placed can pass horizontally from the heating chamber. The second opening $7a$ is adapted to be openable and closable by the lifting of the vacuum shielding door 6.

Moreover, the conveyance rod 22, the chain, and the chain wheel constitutes a transfer unit 20 which horizontally transfers the transfer base 10 on which the object X is placed, between the heating chamber 3 and the cooling chamber 2. In addition, the transfer unit 20 is not limited to this configuration. For example, the conveyance rod 22 may be formed from a straight bar with the required length, this conveyance rod may be horizontally moved by a rack-and-pinion, etc., or may be moved to the cooling chamber from the heating chamber by, for example, a roller hearth.

In FIG. 3, the multi-chamber heat treatment device 1 of the invention further includes a temperature sensor 31 attached to the object X, a signal transmission unit 30, and a temperature measuring unit 40.

The signal transmission unit 30 has the function of transmitting the detected signal of the temperature sensor 31 to the outside of the heating chamber 3 and the cooling chamber 2. Additionally, the temperature measuring unit 40 is arranged outside the heating chamber 3 and the cooling chamber 2, and measures the temperature of the object from the detected signal of the temperature sensor 31 transmitted from the signal transmission unit 30.

Figure 4:
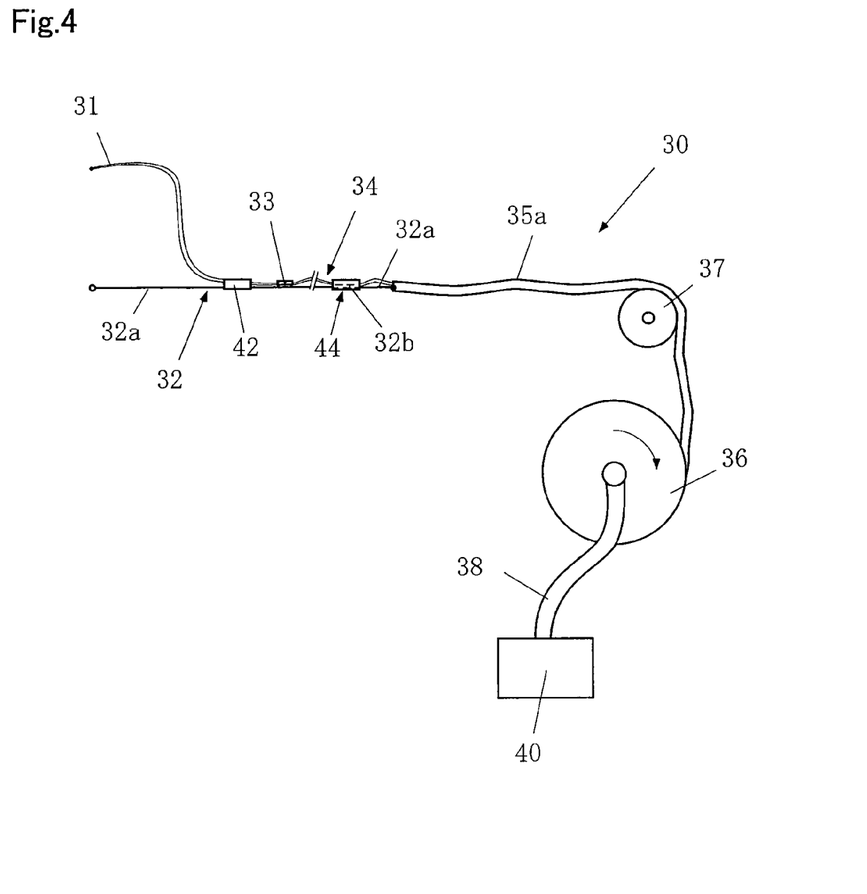
FIG. 4 is an overall configuration view of a first embodiment of a signal transmission unit.

FIG. 4 is an overall configuration view of a first embodiment of the signal transmission unit 30.

As shown in this drawing, the signal transmission unit 30 includes a tension member 32, a signal line 34, a reel unit 36, and an external output line 38.

The tension member 32 is a string-like, hose-like, or strip-like flexible member, and has one end (the left end in the drawing) fixed to the transfer base 10, and the other end horizontally wound in the cooling chamber by the reel unit 36. In addition, in this drawing, reference numeral 37 designates a pulley and has the function of guiding the tension member 32 to the reel unit 36.

Additionally, when the transfer base 10 is located in the heating chamber 3, the tension member 32 is rewound from the reel unit 36 through the opening (the first opening 23a) of the heating chamber 3 and the opening (the second opening 7a) of the cooling chamber, and extends almost horizontally.

The signal line 34 is a flexible electric signal line, and has a connector 33 connected to an output line of the temperature sensor 31 at one end. Additionally, the signal line 34 extends along the tension member 32 to the other end, and is connected to an output contact point (not shown) provided at the reel unit 36.

The reel unit 36 is adapted to wind the tension member 32 along with the signal line 34 while applying tension to the tension member 32 in a winding direction.

The external output line 38 is connected to the other end of the signal line 34 via the reel unit 36, and transmits the detected signal from the temperature sensor 31 to the outside of the cooling chamber 2.

In this example, the signal line 34 is connected to an output contact point of the reel unit 36 through a flexible hose 35a having heat resistance which withstands the temperature in the cooling chamber. The hose 35a functions as a portion of the tension member 32, without making tension act on the signal line 34.

In FIG. 4, the tension member 32 includes a heat-resistant string member 32a and a flexible hose 35a.

The heat-resistant string member 32a is made of a material having heat resistance which withstands the temperature (for example, 1200 to 1400° C.) in the heating chamber, for example, a graphite string. One end of the heat-resistant string member 32a is fixed to the transfer base 10. The length of the heat-resistant string member 32a is set to such a length that the other end of the string member is located in the cooling chamber 2, when the transfer base 10 is located in the heating chamber 3.

The flexible hose 35a includes a hollow elastic hose having heat resistance which withstands at least the temperature (for example, 200 to 300° C.) in the cooling chamber 2. The tip of the flexible hose 35a is fixed to a terminal (a right end in the drawing) of the heat-resistant string member 32a, and the terminal thereof is wound around the reel unit 36 at the rear end.

Moreover, the tension member 32 is provided with a first pinching portion 42 and a second pinching portion 44 (elastic portion).

Figure 5:
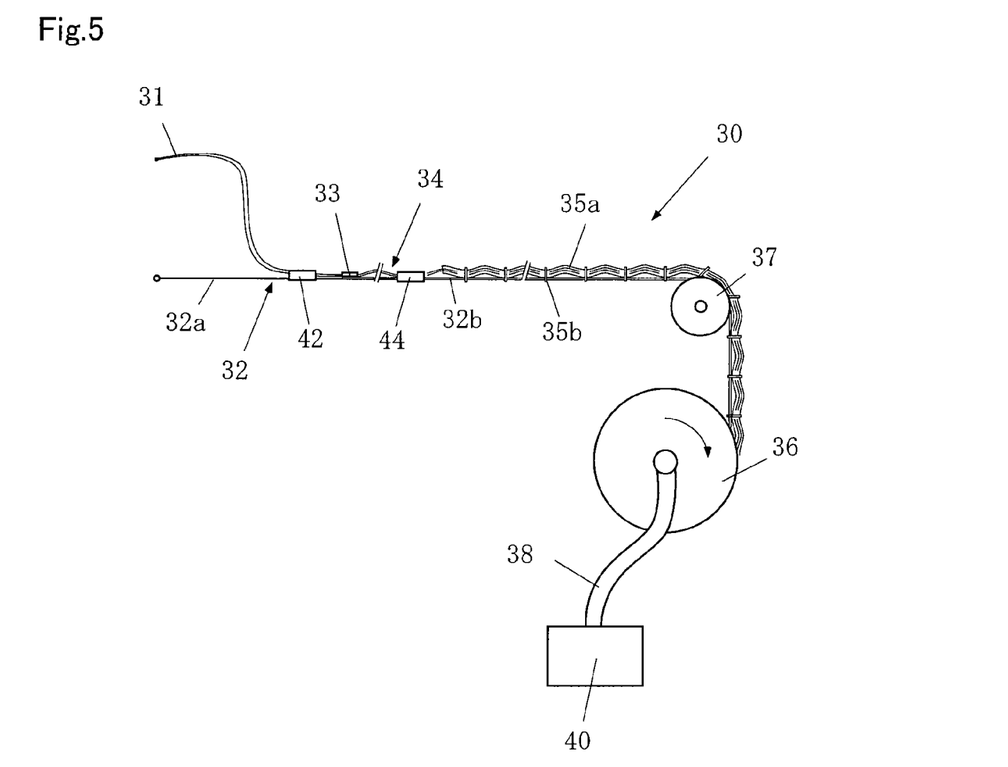
FIG. 5 is an overall configuration view of a second embodiment of the signal transmission unit.

FIG. 5 is an overall configuration view of a second embodiment of the signal transmission unit 30.

In this example, the hose 35a is gripped on the tension member 32 by a fastening line 35b, and is adapted to move along with the tension member 32, without making tension act on the signal line 34.

The tension member 32 includes the heat-resistant string member 32a and a guide strip 32b in FIG. 5.

The heat-resistant string member 32a is made of a material having heat resistance which withstands the temperature (for example, 1200 to 1400° C.) in the heating chamber, for example, a graphite string. One end of the heat-resistant string member 32a is fixed to the transfer base 10. The length of the heat-resistant string member 32a is set to such a length that the other end of the string member is located at an intermediate position between the first opening 23a and the second opening 7a, when the transfer base 10 is located in the heating chamber 3.

The guide strip 32b is made of an elastic strip (for example, a stainless steel strip) having heat resistance which withstands at least the temperature (for example, 200 to 300° C.) in the cooling chamber 2. The tip of the guide strip 32b is fixed to a terminal (a right end in the drawing) of the heat-resistant string member 32a, and the terminal thereof is wound around the reel unit 36 at the rear end.

The other configurations are the same as those of FIG. 4.

Figure 6:
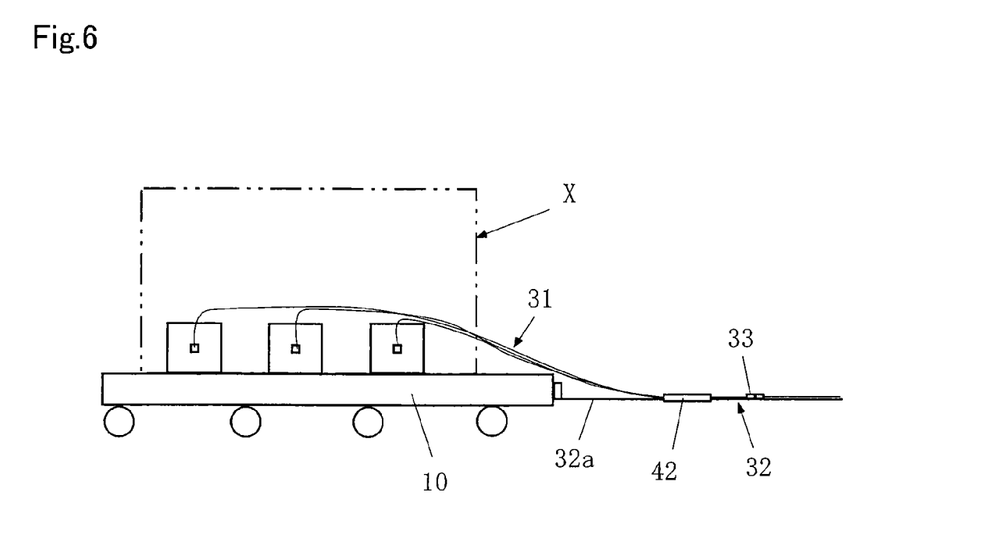
FIG. 6 is a view illustrating the positional relationship between a transfer base on which an object to be treated is placed and a first pinching portion.
Figure 7:
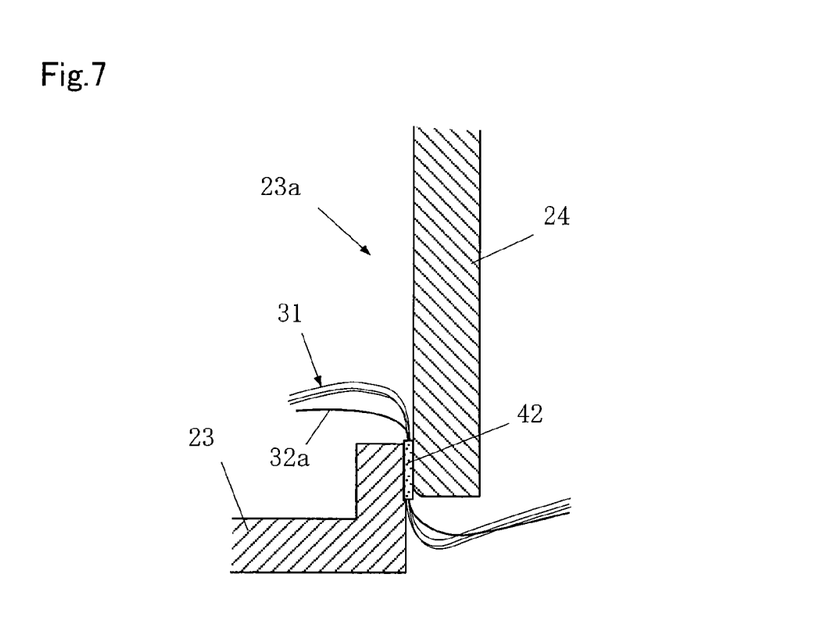
FIG. 7 is a view illustrating the positional relationship between a heating container which has closed a heat insulation door and the first pinching portion.

FIG. 6 is a view illustrating the positional relationship between the transfer base 10 on which the object X is placed and the first pinching portion 42, and FIG. 7 is a view illustrating the positional relationship between the heating container 23 in which the heat insulation door 24 is closed and the first pinching portion 42.

As shown in FIGS. 3 to 7, the first pinching portion 42 is provided at an intermediate position of the heat-resistant string member 32a, and has the function of being pinched between the heat insulation door 24 and the heating chamber (the heating container 23) so as to seal the pinched portion to some extent, when the first opening 23a of the heating chamber 3 is closed by the heat insulation door 24.

The first pinching portion 42 is made of a first heat-resistant seal material (for example, a graphite string) having heat resistance which withstands the temperature in the heating chamber 3, and bundles the heat-resistant string member 32a and the output line of the temperature sensor 31 in the shape of a thin plate equivalent to a gap between the heat insulation door 24 and the heating chamber (the heating container 23).

By this configuration, as shown in FIG. 6, in a state where the transfer base 10 on which the object X is placed is housed in the heating chamber (the heating container 23), one end of the tension member 32 (the heat-resistant string member 32a) is fixed to the transfer base 10, and the other end of the tension member 32 is horizontally wound in the cooling chamber. Therefore, the tension member 32 is brought into a state where the tension member extends almost horizontally through the first opening 23a and the second opening 7a.

Additionally, in this state, the connector 33 is closer to the winding side than the first pinching portion 42, and the output line of the temperature sensor 31 is set to be sufficiently longer than the required length to the connector 33. Thus, tension does not act on the output line of the temperature sensor 31.

Next, when the heat insulation door 24 is moved down in the state of FIG. 6, and the first opening 23a of the heating chamber 3 is closed by the heat insulation door 24, as shown in FIG. 7, the first pinching portion 42 can be pinched between the heat insulation door 24 and the heating chamber (the heating container 23) to seal the pinched portion and intercept transfer of a high temperature in the heating container 23 to the outside by the heat insulation door 24.

Even in this state, since the output line of the temperature sensor 31 is set to be sufficiently longer than the required length to the connector 33. Thus, tension does not act on the output line of the temperature sensor 31. Additionally, since the connector 33 is located outside of the heating chamber 3 and the high temperature of the heating chamber 3 is intercepted by the heat insulation door 24, it is possible to prevent overheating of the connector 33.

Figure 8A:
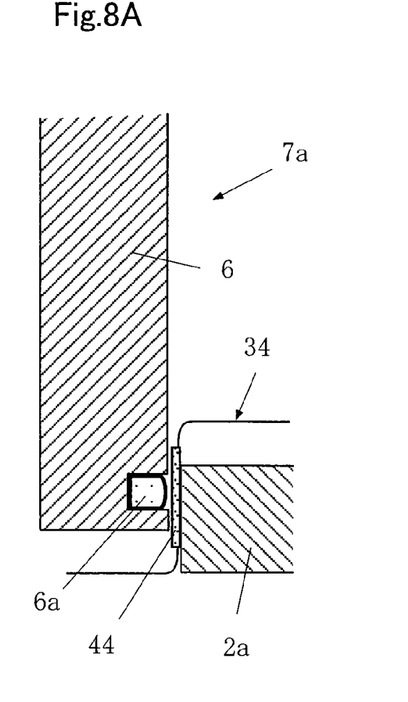
FIG. 8A is a first view illustrating a seal structure between a vacuum shielding door and a partition wall of a cooling chamber.
Figure 8B:
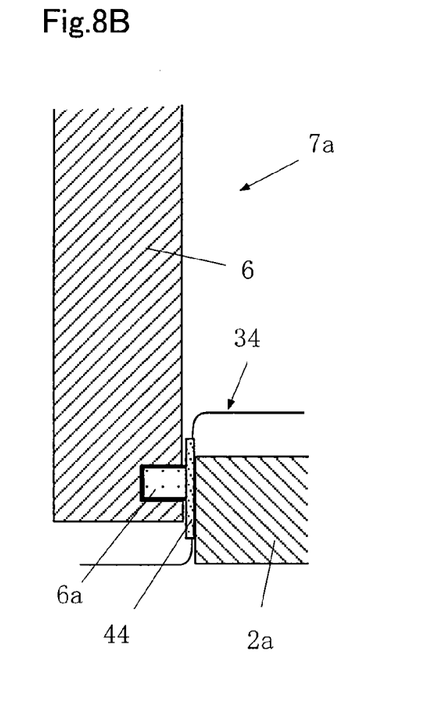
FIG. 8B is a second view illustrating the seal structure between the vacuum shielding door and the partition wall of the cooling chamber.
Figure 8C:
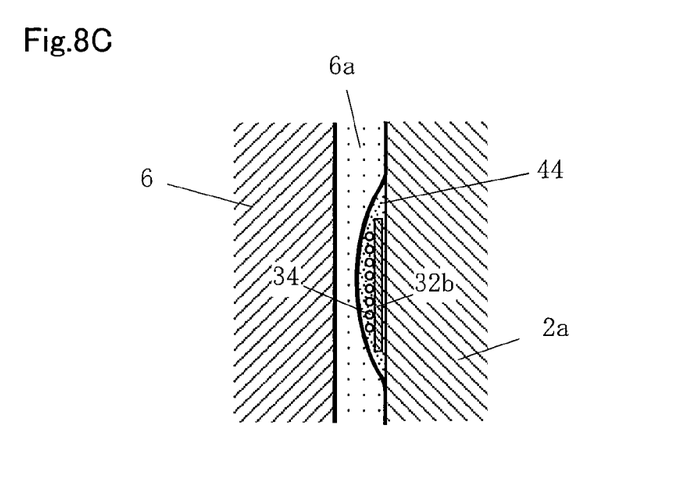
FIG. 8C is a third view illustrating the seal structure between the vacuum shielding door and the partition wall of the cooling chamber.

FIGS. 8A to 8C are views illustrating the positional relationship between the cooling chamber 2 in which the vacuum shielding door 6 is closed and the second pinching portion 44 when the transfer base 10 on which the object X is placed is located in the heating chamber 3.

As shown in FIGS. 8A and 8B, the second pinching portion 44 has the function of being pinched between the vacuum shielding door 6 and the cooling chamber 2 (partition wall 2a) to seal the pinched portion, when the opening (the second opening 7a) of the partition wall 2a is closed by the vacuum shielding door 6.

As shown in FIG. 8A, the vacuum shielding door 6 has a seal material 6a which seals between the vacuum shielding door 6 and the cooling chamber 2 (the partition wall 2a) airtightly. The seal material 6a is a tube seal in this example. The tube seal 6a is adapted to be able to expand to the state of FIG. 8B from the state of FIG. 8A by gas pressure, and eliminate the gap therebetween to make an airtight seal to some extent. In addition, the seal material 6a may be other seal materials, for example, an 0 ring.

As shown in FIG. 8C, the second pinching portion 44 (the elastic portion) is made of a second heat-resistant seal material (for example, silicone or Teflon (registered trademark)) having heat resistance which withstands the temperature in the cooling chamber 2. The second pinching portion 44 bundles and integrally molds the guide strip 32b and the signal line 34, and has a cross-sectional shape which the tube seal 6a of the vacuum shielding door 6 can deform to follow the cross-sectional shape.

In this example, the cross-sectional shape of the second pinching portion 44 is such that the surface which is brought into close contact with the partition wall 2a is formed as a flat surface, and the surface which is brought into close contact with the tube seal 6a is formed as an arcuate surface. However, the invention is not limited thereto, and any arbitrary shapes may be adopted.

In addition, in the example of FIG. 4, the guide strip 32b exists only inside the second pinching portion 44, and connects the heat-resistant string member 32a before and behind the guide strip.

Additionally, in the example of FIG. 5, the guide strip 32b is continuous through the second pinching portion 44.

By this configuration, as shown in FIG. 7, the first pinching portion 42 is pinched between the heat insulation door 24 and the heating chamber (the heating container 23) to insulate and seal the pinched portion to some extent, and intercept transfer of a high temperature in the heating chamber 3 to the outside by the heat insulation door 24. Moreover, as shown in FIG. 8A, the vacuum shielding door 6 is closed and the tube seal 6a is expanded to the state of FIG. 8B from the state of FIG. 8A by gas pressure, so that the gap therebetween can be made as small as possible and thus the second opening can be sealed.

In this state, since the guide strip 32b and the signal line 34 which are confined in the elastic portion 44 are integrally molded in the second pinching portion 44, and the signal line 34 is fixed along the heat-resistant string member 32a or the guide strip 32b in a loosened state in other portions, tension does not act on the signal line 34.

FIGS. 9A to 9D are schematic views illustrating how to use the multi-chamber heat treatment device 1 of the invention described above.

Figure 9A:
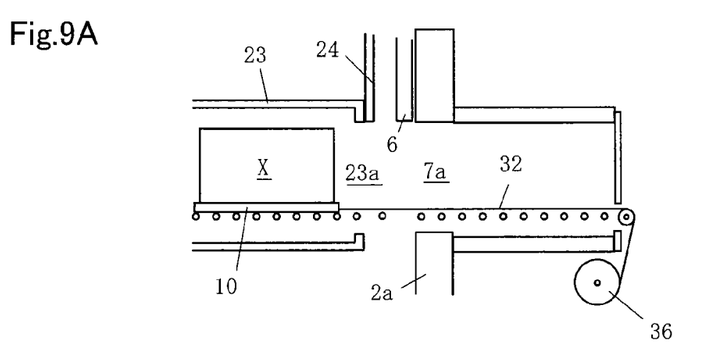
FIG. 9A is a first schematic view illustrating how to use the multi-chamber heat treatment device of the invention.
Figure 9B:
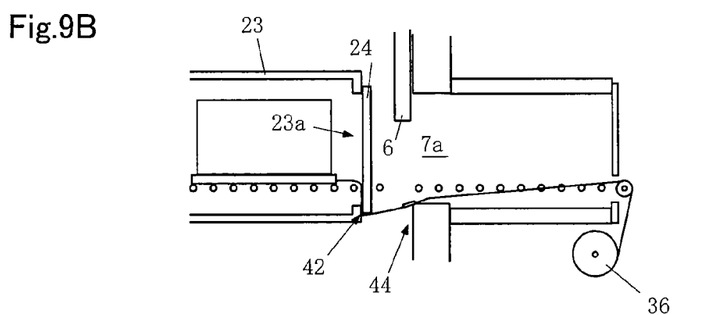
FIG. 9B is a second schematic view illustrating how to use the multi-chamber heat treatment device of the invention.
Figure 9C:
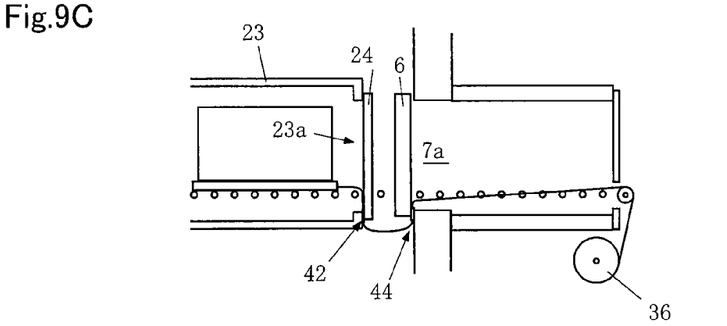
FIG. 9C is a third schematic view illustrating how to use the multi-chamber heat treatment device of the invention.
Figure 9D:
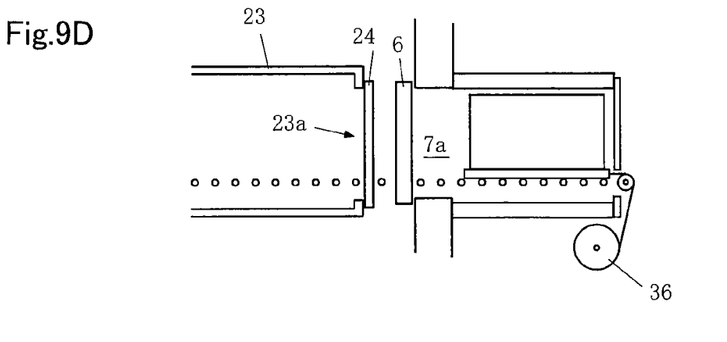
FIG. 9D is a fourth schematic view illustrating how to use the multi-chamber heat treatment device of the invention.

FIG. 9A shows a state where the transfer base 10 on which the object X is placed is housed in the heating container, FIG. 9B shows a heating treatment state where the heat insulation door 24 is closed, FIG. 9C shows a heating treatment state where the vacuum shielding door 6 is closed, and FIG. 9D shows a cooling treatment state in the cooling chamber 2.

In FIG. 9A, one end of the tension member 32 is fixed to the transfer base 10 on which the object X is placed in the heating chamber (the heating container 23), and the other end of the tension member 32 is horizontally wound in the cooling chamber. Therefore, the tension member 32 is brought into a state where the tension member extends almost horizontally through the first opening 23a and the second opening 7a. In this state, the connector 33 is closer to the winding side than the above-described first pinching portion 42, and the output line of the temperature sensor 31 is set to be sufficiently longer than the required length to the connector 33. Thus, tension does not act on the output line of the temperature sensor 31.

In FIG. 9B, when the heat insulation door 24 is moved down, and the first opening 23a of the heating chamber 3 is closed by the heat insulation door 24, the above-described first pinching portion 42 can be pinched between the heat insulation door 24 and the heating chamber (the heating container 23) to insulate the pinched portion and intercept transfer of a high temperature in the heating chamber 3 to the outside by the heat insulation door 24.

In FIG. 9C, the vacuum shielding door 6 is closed and the tube seal 6a is expanded by gas pressure, so that the gap between the vacuum shielding door 6 and the partition wall 2a can be made as small as possible by the second pinching portion 44 and thus the second opening 7a can be sealed.

When the vacuum shielding door 6 and the heat insulation door 24 are opened after the heating treatment in the heating chamber 3, the tension member 32 is brought into a state where the tension member extends almost horizontally through the first opening 23a and the second opening 7a, as in FIG. 9A.

In this state, when the transfer base 10 on which the object X is placed is horizontally moved to the cooling chamber 2 from the heating chamber 3 by the above-described transfer unit 20, the tension member 32 is wound by the reel unit 36, without causing loosening.

Using the above-described units, a temperature control method of a multi-chamber heat treatment device of the invention transmits the detected signal from the temperature sensor 31 attached to the object X to the outside of the heating chamber 3 and the cooling chamber 2, measures the temperature of the object X from the detected signal of the temperature sensor 31 transmitted from the signal transmission unit 30, outside the heating chamber 3 and the cooling chamber 2, and controls the multi-chamber heat treatment device 1 on the basis of the measured temperature of the object.

The above-described temperature measuring unit 40 has also the function as a data recorder which measures the temperature of the object X on the basis of the temperature detection signal acquired in the temperature sensor 31, and stores the temperature detection result.

In the invention, a thermocouple is used as the temperature sensor 31 and the signal line 34 is constituted by a pair of (two kinds) conducting wires. Specifically, for example, signal lines made of chromel-alumel, chromel-constantan, iron-constantan, copper-constantan, nicrosil-nisil, platinum·rhodium (10%)-platinum, platinum·rhodium (13%)-platinum, platinum·rhodium (30%)-platinum·rhodium (6%), chromel-gold·iron, iridium-iridium·rhodium (49%), tungsten/rhenium (5%)-tungsten·rhenium (26%), nickel-nickel·molybdenum (18%), and palladium·platinum·golden-gold·palladium are used as the signal line 34.

The hose 35a is formed from, for example, a material having flexibility, such as resin. Damage to the signal line 34 can be prevented by inserting the signal line 34 through the inside of such a hose 35a.

According to the apparatus and method of the above invention, the heating chamber 3 which heat-treats the object X, the heat insulation door 24, the cooling chamber 2 which cools the object X, the vacuum shielding door 6, and the transfer unit 20 which horizontally transfers the transfer base 10 on which the object X is placed between the heating chamber 3 and the cooling chamber 2 are provided. Thus, the object X can be heat-treated in the heating chamber 3, and can then be moved into the cooling chamber 2 and be subjected to cooling treatment in the cooling chamber 2.

Additionally, the temperature sensor 31 attached to the object X, and the signal transmission unit 30 which transmits the detected signal from the temperature sensor 31 to the outside of the heating chamber 3 and the cooling chamber 2 are provided. Thus, the detected signal of the temperature sensor 31 attached to the object X can be transmitted to the outside of the heating chamber 3 and the cooling chamber 2, the temperature of the object X can be measured from the detected signal of the temperature sensor 31 transmitted from the signal transmission unit 30 outside the heating chamber 3 and the cooling chamber 2, and the temperature of the object X during heating treatment and cooling treatment can be measured in real time.

Additionally, the tension member 32 includes the heat-resistant string member 32a which has one end fixed to the transfer base 10, and the flexible hose 35a or guide strip 32b which has a tip fixed to the terminal of the heat-resistant string member 32a and has a terminal wound around the reel unit 36, and further has the first pinching portion 42 provided at an intermediate position of the heat-resistant string member 32a. Thus, when the first opening is closed by the heat insulation door 24, the first pinching portion 42 is pinched between the heat insulation door 24 and the heating container 23. Thus, the pinched portion is heat-insulated, and tension does not act on the object X. Thus, even when winding tension is high, there is no possibility of the object X loaded into the heating chamber 3 moving.

Additionally, the tension member has a second pinching portion 44 provided at the intermediate position of the heat-resistant string member 32a or guide strip 32b. Thus, when the second opening is closed by the vacuum shielding door 6, the second pinching portion 44 is pinched between the vacuum shielding door 6 and the cooling chamber 2a and thus the pinched portion is sealed, so that heat dissipation of the heat insulation door 24 of the heating chamber 3 can be suppressed during the treatment in the heating chamber, the vacuum shielding door 6 of the cooling chamber 2 can be sealed, and thereby the gas atmosphere of the heating chamber 3 and the cooling chamber 2 can be independently controlled.

Accordingly, outside the heating chamber 3 and the cooling chamber 2, the temperature of the object X can be measured from the detected signal of the temperature sensor 31 transmitted from the signal transmission unit 30, and the multi-chamber heat treatment device 1 can be controlled on the basis of the measured temperature of the object X.

Additionally, the invention is not limited to the above-described embodiments, but can be, of course, modified into various forms without departing from the spirit of the invention.

The invention claimed is:

1. A multi-chamber heat treatment device comprising:
   (a) a heating chamber that incorporates a heating container having a first opening and a transfer base that is horizontally passable through the first opening, wherein the transfer base is disposed so that an object to be treated is placeable for heat-treating thereon;
   (b) a heat insulation door arranged to open and close the first opening;
   (c) a cooling chamber that is adjacent to the heating chamber and has a second opening, wherein the transfer base is horizontally passable through the second opening, and wherein the cooling chamber is operably connected to cool a heat-treated object;
   (d) a vacuum shielding door arranged to open and close, and thereby seal, the second opening;
   (e) a transfer unit that is operably connected to horizontally transfer the transfer base between the heating chamber and the cooling chamber,
   (f) a temperature sensor that is attachable to the object; and
   (g) a signal transmission unit that is operably connected to transmit a detected signal from the temperature sensor to an outside of the heating chamber and the cooling chamber, wherein the signal transmission unit has
   (i) a flexible tension member with two ends, wherein one end of the flexible tension member is fixed to the transfer base, wherein the flexible tension member extends through the first opening and the second opening, and wherein the other end of the flexible tension member is horizontally wound in the cooling chamber, wherein the flexible tension member comprises
   (1) a heat-resistant string member that has one end fixed to the transfer base,
   (2) a flexible hose having heat resistance that has a tip fixed to a terminal of the heat-resistant string member and a terminal wound around the reel unit, and withstands at least the temperature in the cooling chamber;
   (3) a first deformable pinching seal portion, wherein the first deformable pinching seal portion is deformable between the heat insulation door and the heating container, and, when deformed seals the first opening by filling any gap between the heat insulation door and the heating container, and
   (4) a second deformable pinching seal portion that is deformed between the vacuum shielding door and the cooling chamber to seal the deformable pinching seal portion, when the second opening is closed by the vacuum shielding door;
   (ii) a signal line that has a connector with two ends, wherein the connector is connected to the output line of the temperature sensor at one end, and extends along the tension member to the other end;
   (iii) a reel unit that winds the tension member together with the signal line while applying tension in a winding direction to the tension member; and
   (iv) an external output line that is connected to the other end of the signal line via the reel unit, and wherein the external output line is operably connected to transmit the detected signal to the outside of the heating chamber and the cooling chamber wherein the signal line passes through the flexible hose, and wherein the first deformable pinching seal portion is provided on the heat-resistant string member.

2. The multi-chamber heat treatment device according to claim 1, further comprising a temperature measuring unit that is arranged outside the heating chamber and the cooling chamber to measure the temperature of the object from the detected signal of the temperature sensor transmitted from the signal transmission unit.

3. The multi-chamber heat treatment device according to claim 1, wherein the (i) flexible tension member further includes:
   (1') the heat-resistant string member, wherein the heat-resistant string member that has a second end extending to the inside of the cooling chamber when the transfer base is located in the heating chamber, and withstands the temperature in the heating chamber and the cooling chamber.

4. The multi-chamber heat treatment device according to claim 1, wherein the second deformable pinching portion is provided at an intermediate position of the heat-resistant string, is made of a second heat-resistant seal material having heat resistance that bundles and integrally molds a guide strip that connects a heat-resistant string member and the signal line, and that withstands the temperature in the cooling chamber, and has a cross-sectional shape that the seal material of the vacuum shielding door can deform to follow the cross-sectional shape.

5. The multi-chamber heat treatment device according to claim 1,
wherein the (i) flexible tension member further includes:
(1') the heat-resistant string member having heat resistance that has one end fixed to the transfer base and the other end extending to an intermediate position between the first opening and the second opening when the transfer base is located in the heating chamber, and withstands the temperature in the heating chamber; and
(3) a guide strip having heat resistance that has a tip fixed to a terminal of the heat-resistant string member and a terminal wound around the reel unit, and withstands at least the temperature in the cooling chamber.

6. The multi-chamber heat treatment device according to claim 1, wherein the second deformable pinching portion is provided at an intermediate position of the guide strip, is made of a second heat-resistant seal material having heat resistance that bundles and integrally molds the guide strip and the signal line and that withstands the temperature in the cooling chamber, and has a cross-sectional shape that the seal material of the vacuum shielding door can deform to follow the cross-sectional shape.

\* \* \* \* \*